United States Patent [19]

Busch et al.

[11] 4,181,637

[45] Jan. 1, 1980

[54] SHEET-LIKE STRUCTURE OF POLYURETHANE, WHICH IS CAPABLE OF ABSORBING WATER VAPOR AND TRANSMITTING WATER VAPOR

[75] Inventors: Walter Busch; Arno Holst, both of Wiesbaden; Wilhelm Fischer, Pirmasens, all of Fed. Rep. of Germany

[73] Assignee: Hoechst Aktiengesellschaft, Fed. Rep. of Germany

[21] Appl. No.: 863,446

[22] Filed: Dec. 22, 1977

[30] Foreign Application Priority Data

Dec. 24, 1976 [LU] Luxembourg ............................. 76474

[51] Int. Cl.² ........................... C08L 1/28; C08L 3/08
[52] U.S. Cl. ............................. 260/16; 204/159.12; 204/159.14; 204/159.2; 204/160.1; 260/9; 260/13; 260/17.4 GC; 428/243; 428/423; 428/425; 428/532; 428/904; 428/913
[58] Field of Search ...................................... 260/9, 16

[56] References Cited

U.S. PATENT DOCUMENTS

| | | | |
|---|---|---|---|
| 3,137,664 | 6/1964 | Shulman et al. | 260/9 |
| 3,488,302 | 6/1970 | Pyron | 260/9 |
| 3,992,495 | 11/1976 | Sano et al. | 204/160.1 |

FOREIGN PATENT DOCUMENTS

| | | | |
|---|---|---|---|
| 558218 | 6/1958 | Canada | 260/9 |
| 948762 | 2/1964 | United Kingdom | 204/159.12 |

*Primary Examiner*—Edward M. Woodberry
*Attorney, Agent, or Firm*—James E. Bryan

[57] ABSTRACT

This invention relates to a sheet-like structure of polyurethane, which is capable of absorbing water vapor and transmitting water vapor, with a uniformly incorporated additive composed of solid particles of at least one swellable, modified polymer. The invention also relates to a process for manufacturing the sheet-like structure.

3 Claims, 2 Drawing Figures

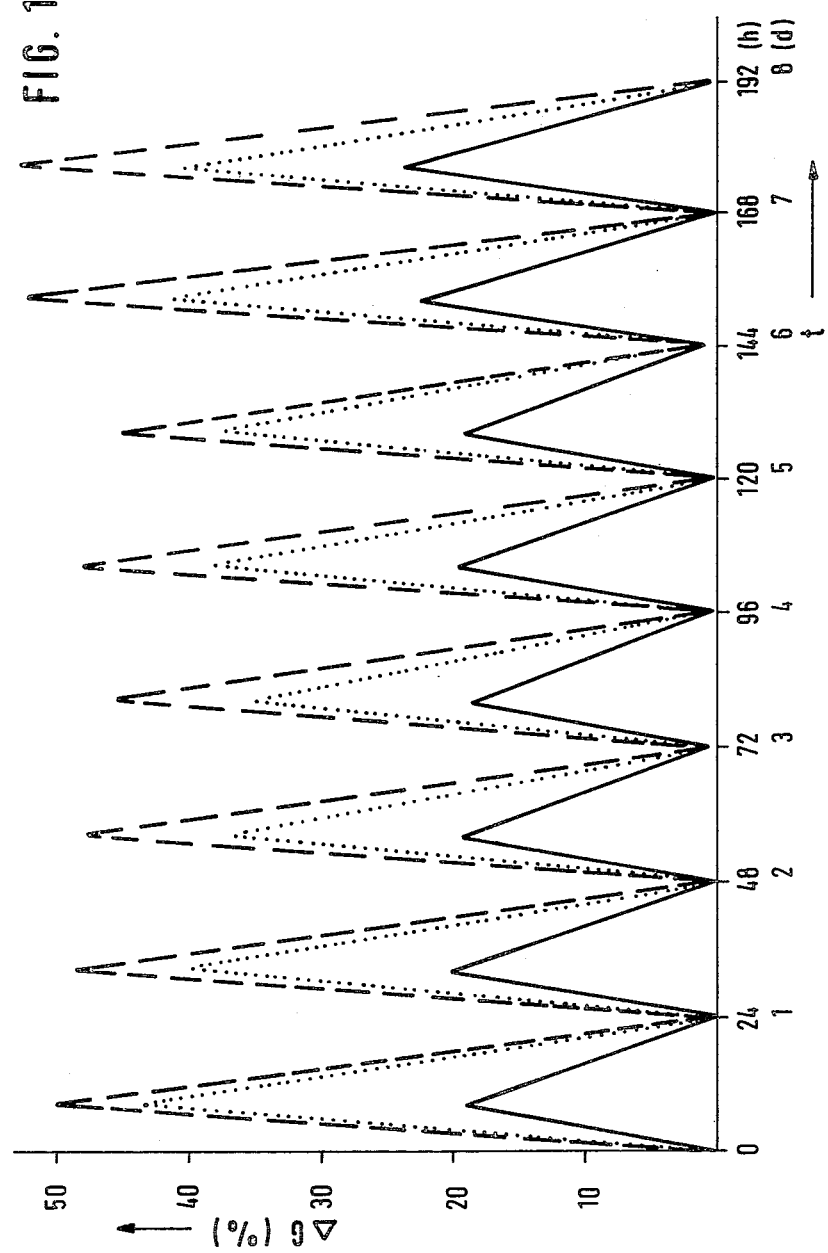

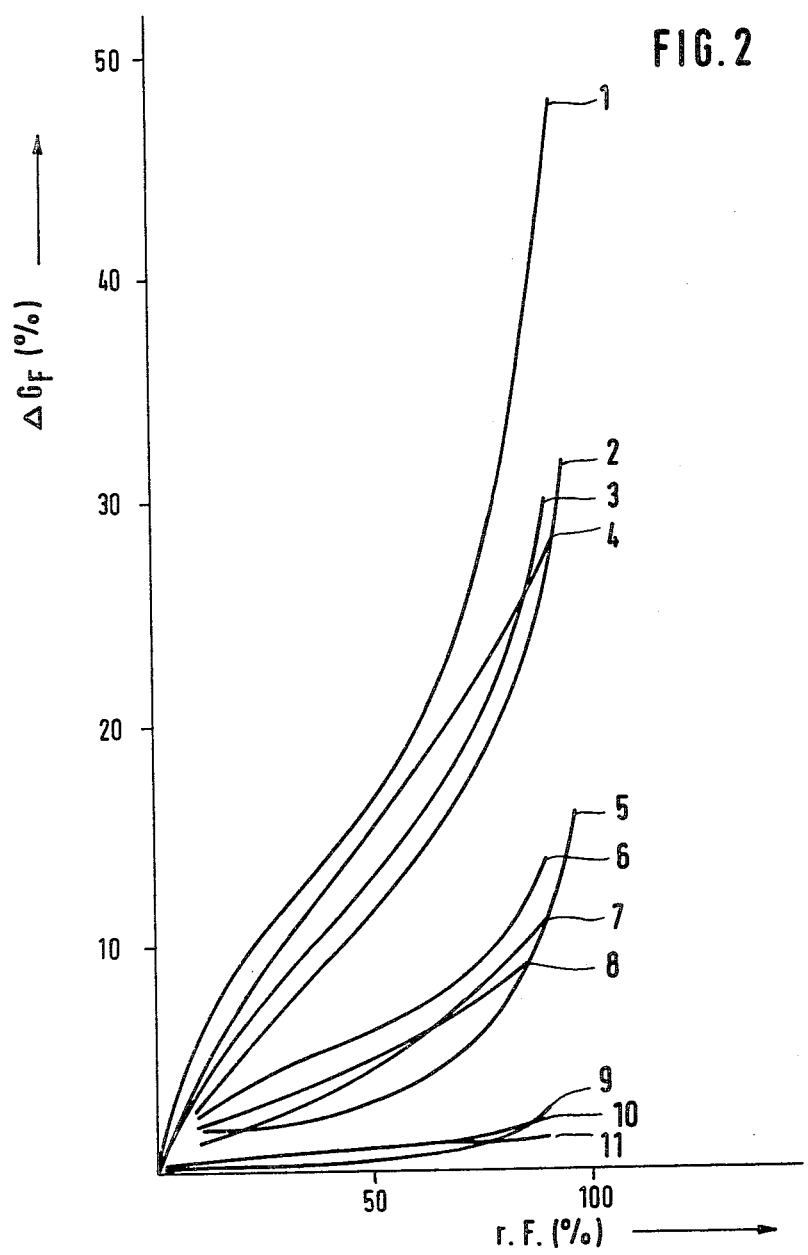

SHEET-LIKE STRUCTURE OF POLYURETHANE, WHICH IS CAPABLE OF ABSORBING WATER VAPOR AND TRANSMITTING WATER VAPOR

This invention relates to a sheet-like structure of polyurethane, which has an improved water vapor absorption capacity and water vapor transmission rate, and to processes for the manufacture of these sheet-like structures.

Sheet-like structures of this type are used in various fields of technology; these include, for example, the use as a leather substitute (synthetic leather) for shoe upper material, bag materials, upholstery covers and outer garments (leather garments and all-weather garments). Processes for the manufacture of such sheet-like structures which are produced as self-supporting films or in most cases as multi-layer sheet-like structures (for example composed of one or more covering layers and one or more carrier layers), for example from a base of a fiber material and a microporous layer, applied thereto, of polyurethane or from a microporous polyurethane film, have been known for a long time (see, for example, Kunststoffhandbuch "Plastics Handbook", Volume VII, "Polyurethanes", by R. Vieweg and A. Höchtlen, Carl Hanser Verlag, Munich (1966)). When these sheet-like structures are employed in one of the fields of application mentioned, it is one of the decisive demands made of the material that it be capable of absorbing water vapor and transmitting water vapor in order to provide, for example on the body, comfortable wearing and a good wearing climate.

To obtain these required properties, four processes are primarily used:

1. Incorporation of soluble materials into the polyurethane or its reaction precursors, and preparation of a film or a coating from the mixture, in most cases by spreading and solvent extraction of the finished sheet-like structure. The problem in this process is above all the washing-out step and the associated handling of large quantities of solvent.
2. Incorporation of fillers and hence an effect on the pore structure but also on the hydrophilic character of the polymer, depending on the characteristics of the filler.
3. Applying a fluid solution containing polyurethane and allowing the polymer layer to coagulate in order to produce a microporous layer.
4. Controlled use of defined starting materials for the manufacture of the polyurethane film or layer, that is to say, for example, the use of polyols, diisocyanates or chain extenders, having defined physicochemical properties.

French Pat. No. 1,462,597, describes a process for the manufacture of a coating on a fibrous base. The coating material used for this purpose is a mixture in the form of an aqueous dispersion of a film-forming polymer (for example a polyurethane), droplets of an organic solvent and a modifier for improving the mechanical stability of the mixture. Water-soluble methylcellulose and soluble casein are mentioned as modifiers.

A process for the manufacture of an open-pored, gas-transmitting sheet-like structure from elastomers, in particular from linear polyurethanes, is described in DT-AS No. 1,957,889. In this process, elastomer solutions are used which, for forming the pores, contain a combination of two activating gels, each of which consists of swellable, finely pulverulent minerals. Silica aerosols, silica gels and bentonites are used as the mineral gel formers.

British Pat. No. 1,414,961, discloses a process for the manufacture of a polyurethane coating which transmits water vapor. Solid substances of a type soluble in water or an organic solvent are incorporated in finely divided form into the mixture of a polyol and a polyisocyanate, used for this coating. These finely divided substances are removed again from the polymerized coating in a solvent extraction step; preferably, this substance is NaCl, but other salts, such as $Na_2SO_4$ and $MgSO_4$, are also mentioned.

DT-OS No. 2,364,628, discloses a structure, rendered hydrophilic, of a fiber-forming and a film-forming water-insoluble polymer, which contains particles of a modified cellulose ether. The following are mentioned as polymers: regenerated cellulose (cellulose hydrate), cellulose acetate, polyalkylene, alkylcellulose, polyacrylonitrile, polyamide and polyester. The modified cellulose ethers are those, of which the mere degree of etherification would lead to water-soluble cellulose ethers and which are modified in such a way that, at least for the major part, they have become water-insoluble but have remained capable of absorbing water. The structure, rendered hydrophilic, carries the particles of modified cellulose ether in uniform distribution in its polymeric mass or has a surface covered by the particles. The uses as ion exchangers or as dialysis membranes or osmosis membranes are mentioned as technological fields of application for films manufactured in this way.

It is the object of the present invention to provide a sheet-like structure, based on polyurethanes, which is capable of absorbing water vapor and transmitting water vapor and which is improved as compared with the state of the art.

The invention starts from a sheet-like structure of polyurethane, which is capable of absorbing water vapor and transmitting water vapor, with a uniformly incorporated additive composed of solid particles. The sheet-like structure according to the invention comprises, as the additive, particles of at least one swellable, modified polymer. Swellable polymers are to be understood as those which swell in aqueous liquids, in particular liquids having a water content of more than 50% by weight, or which swell as a result of water molecules coming into contact with them by other means (for example water vapor). The term "uniformly incorporated" is here to be understood as a statistical distribution. The polymer is insoluble in water, in particular to the extent of at least 50% by weight. Advantageously, the particles are of a size of $\leq 250$ μm, preferably of $\leq 150$ μm, and are in general present in a pulverulent or fibrous form.

In a preferred embodiment, the sheet-like structure contains about 10 to 30% by weight of the additive of the particles composed of at least one swellable, modified polymer.

The following, for example, are suitable as swellable, modified, polymers for the additive in the material according to the invention:

Cross-linked polyalkylene oxide according to DT-OS No. 2,048,721; in the process for the manufacture of this product, water-soluble polyalkylene oxides are treated with ionizing radiation of sufficient intensity to effect cross-linking and to render the polymer insoluble. The polyalkylene oxide here can be irradiated in the solid state or in solution.

The absorbent, cross-linked copolymer containing carboxyl groups according to DT-OS No. 2,507,011, obtained from a α,β-unsaturated acid and an acetal of the general formula $$(CH_2=CH-CH_2-O)_2-CH-(CH_2)_n-CH-(O-CH_2-CH=CH_2)_2$$

where n is 0, 1 or 2. Acrylic acid, methacrylic acid, itaconic acid, α-phenylacrylic acid or α-benzylacrylic acid are here particularly suitable as the α,β-unsaturated acid; in the manufacture of this copolymer, 0.1% to 15% by weight of the acetal are advantageously used per 85% to 99.9% by weight of one of the unsaturated acids.

A hydrocolloidal polymer according to U.S. Pat. No. 3,670,731 (=DT-OS No. 1,642,072), which has been rendered water-insoluble by cross-linking and is suitable for absorbing liquids and also retaining them; certain polyacrylamides, alkali metal salts of hydrolyzed polyacrylamides and alkali metal salts of polystyrene sulfonic acids are mentioned in particular.

A cross-linked, insoluble, physiologically harmless polymer, which is swellable in water, according to U.S. Pat. No. 3,669,103 (DT-OS No. 1,617,998) from the group comprising poly-N-vinylpyrrolidones, polyacrylamides, polyacrylic acid and polyglycols.

Absorbent polymers which are, at least for the major part, water-insoluble and swellable with water and which have been manufactured by the process of German Application No. P 25 41 035.9; these are manufactured by etherification, in a homogeneous phase, of polyhydroxymethylene in an aqueous-alkaline solution with an α-halogenocarboxylic acid and by reaction, before, during or after the etherification, with a cross-linking agent which in an alkaline medium is polyfunctional towards polyhydroxymethylene.

In particular, the following swellable, modified carbohydrate derivatives can be used within the scope of the invention: alkali metal salts of carboxymethylcellulose, which are heat-treated and are swellable in water, according to U.S. Pat. No. 2,639,239; in the process for the manufacture of this product, the solubility of a water-soluble alkali metal salt of carboxymethylcellulose having a D.S. (=degree of substitution, i.e., the number of substituted hydroxyl groups on one anhydro-D-glucose unit) of 0.5 up to about 1 is reduced by subjecting this dry salt, in a finely divided form, to a temperature of about 130° to about 210° C., highly swellable gel particles being obtained.

Water-insoluble, heat-treated carboxyalkyl celluloses, which absorb and retain liquids, according to U.S. Pat. No. 3,723,413 (=DT-OS No. 2,314,689); in the process for the manufacture of these products the procedure is that (a) cellulose materials are treated with carboxyalkylating reactants and in this way water-soluble carboxyalkyl cellulose is formed which has an average degree of substitution of more than 0.35 carboxyalkyl radicals per anhydroglucose unit in the cellulose but which possesses poor properties with respect to the absorption and retention of liquids, (b) such a proportion of the carboxyalkylating reactants and the by-products formed during the reaction is removed that, relative to the weight of the water-soluble carboxyalkyl cellulose, at least about 3% by weight thereof remain and (c) the carboxyalkyl cellulose is subjected to a heat treatment in the presence of the remaining carboxyalkylating reactants and by-products of the reaction and, thus, is rendered water-insoluble, and excellent properties with respect to the absorption and retention of liquids are imparted to the carboxyalkyl cellulose.

Absorbent carboxymethyl cellulose fibers which are suitable for use in fiber materials for absorbing and retaining aqueous solutions and are substantially water-insoluble, according to U.S. Pat. No. 3,589,364 (=DT-OS No. 1,912,740); fibers of this type consist of wet-cross-linked fibers of water-soluble salts of carboxymethyl cellulose having a D.S. of about 0.4 to 1.6 and possess the original fiber structure. Preferably, about 3-10% by weight of epichlorohydrin are employed as the cross-linking agent.

Chemically cross-linked, swellable cellulose ethers, according to U.S. Pat. No. 3,936,441 (=DT-OS No. 2,357,079); these cross-linked cellulose ethers, in particular those obtained from carboxymethyl cellulose, carboxymethylhydroxyethyl cellulose, hydroxyethyl cellulose or methylhydroxyethyl cellulose, are manufactured by reacting the ethers, which in themselves are water-soluble, in an alkaline reaction medium with a cross-linking agent, the functional groups of which are

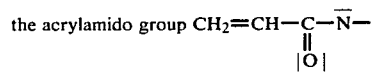

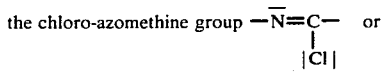

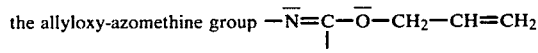

or which is dichloroacetic acid or phosphorus oxychloride.

Chemically modified, swellable cellulose ethers, according to U.S. Pat. No. 3,965,091 (=DT-OS No. 2,358,150); these cellulose ethers which have not been modified by cross-linking are manufactured by reacting the ethers, which in themselves are water-soluble, in an alkaline reaction medium with a monofunctionally reacting compound which is described by one of the two general formulae which follow:

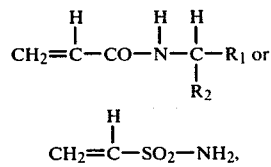

wherein $R_1$ in the formula I denotes an hydroxyl group, an acylamino group or an esterified carbamino group and $R_2$ denotes hydrogen or a carboxyl group.

Chemically cross-linked, swellable cellulose ethers, according to DT-OS No. 2,519,927; these cross-linked cellulose ethers are manufactured by reacting the ethers, which in themselves are water-soluble, in an alkaline reaction medium with bis-acrylamido-acetic acid as the cross-linking agent.

Free-flowing hydrophilic carbohydrates, which are cross-linked by radiation and are swellable in water, according to DT-AS No. 2,264,027; these products are manufactured (in the case of certain other polymers, such as polyethylene oxide or polyvinyl alcohol, similar products also can be obtained by the reaction steps which follow) by:

(a) mixing at least one water-soluble, pulverulent polymeric carbohydrate with such an amount of at least one pulverulent inert filler, the particles of which are smaller than those of the carbohydrate, and in such a way that a substantial part of the surface of the pulverulent carbohydrate is covered, (b) while the mixing is continued, contacting the mixture, while stirring thoroughly, with a finely divided water spray in such an amount that the mixture is preserved in the form of free-flowing particles and (c) then subjecting the resulting mixture to ionizing radiation until the polymeric carbohydrate is cross-linked.

Chemically cross-linked or otherwise modified swellable starch ethers, according to German Application No. P 26 34 539.1; these special starch ethers are manufactured by, for example, carrying out, as the modification, a cross-linking with a cross-linking agent which carries the following functional group which is reactive towards hydroxyl groups:

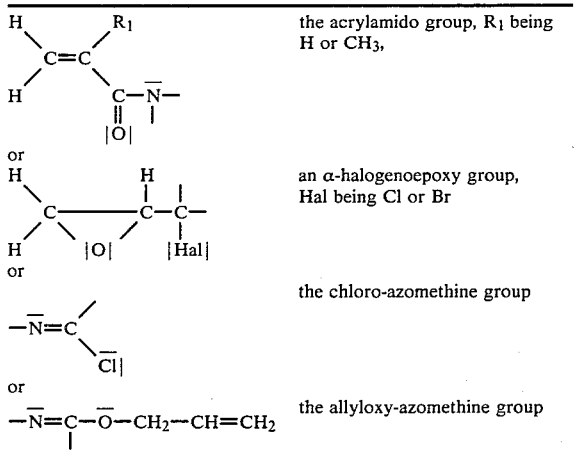

or which is phosphorus oxychloride. The procedure in another mode of manufacture is that the modification is carried out using a compound which is monofunctionally reactive under the stated conditions towards the hydroxyl groups of starch or of the starch ether and which is described by one of the general formulae which follow:

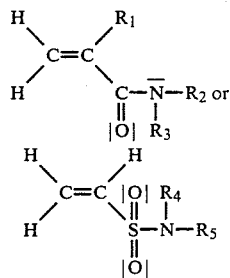

$R_1$ being $CH_3$ or H, $R_2$ being H and $R_3$ being $CH_3$, $CH_2OH$, an N-methylene-acylamido group with 1 to 3 C atoms, an esterified N-methylene-carbamido or N-carboxymethylene-carbamido group with 2 to 7 C atoms, or $R_2$ and $R_3$ being $CH_3$ or $CH_2$—OH and $R_4$ and $R_5$ being H, or $R_4$ being H and $R_5$ being $CH_3$, or $R_4$ and $R_5$ being $CH_3$.

Alkali metal salts of carboxymethyl cellulose, having an increased absorption capacity and retention capacity, according to U.S. Pat. No. 3,678,031 (=DT-OS No. 2,151,973). Although the etherifying agents here employed contain carboxyl groups and would lead to a normally soluble cellulose ether, the conditions of the reaction are selected so that alkali metal salts of a carboxymethyl cellulose, having a D.S. of 0.4–1.2, a water-soluble fraction of <35%, a water retention value (WRV) of about 1,000 to 7,000 and a salt water retention value of about 400 to about 2,500, are formed.

Water-insoluble carboxymethyl celluloses, such as are disclosed in German Pat. No. 1,079,796, and DT-AS No. 1,151,474, i.e., those which have a D.S. of 0.05 to 0.3 and those which are substantially water-insoluble and likewise have a low D.S.

Water-insoluble, more highly polymerized carboxymethyl cellulose or carboxyethyl cellulose with a significant content of free carboxyl groups, according to British Pat. No. 725,887 (=German Pat. No. 1,037,076), which are rendered water-insoluble by heating the water-soluble acid compounds to 80° C. to 177° C.

Phosphorylated cellulose fibers, according to DT-OS No. 2,447,282, such as can be produced by a reaction of cellulose pulp with urea and phosphoric acid under the action of heat, a subsequent acid hydrolysis and ultimately a conversion into the form of a salt.

Dry, solid, water-insoluble absorbents, which are swellable with water, according to DT-OS No. 2,609,144, which consist of an ionic complex of a water-insoluble anionic polyelectrolyte and a cation of a metal which is at least 3-valent; suitable polyelectrolytes are polyacrylic acid, starch derivatives or cellulose derivatives.

Cellulose graft polymers, according to DT-OS No. 2,516,380, which are manufactured by grafting side chains of those polymer radicals onto the cellulose which are selected from the ionic and non-ionic polymer radicals. For example, polyacrylic acid, sodium polyacrylate, polymethacrylic acid, potassium polymethacrylate, polyvinyl alcohol sulfate, polyphosphoric acid, polyvinyl amine, poly-(4-vinylpyridine), hydrolyzed polyacrylonitrile, polymethyl methacrylate, polyvinyl acetate, polystyrene or polybutadiene are suitable for this purpose.

Granulated, water-insoluble alkali metal carboxylate salts of starch/acrylonitrile graft copolymers, according to U.S. Pat. No. 3,661,815, which are manufactured by saponifying starch/acrylonitrile graft copolymers with a base in an aqueous-alkaline medium.

Modified cellulose material, having an improved retention capacity both for water and physiological fluids, according to DT-OS No. 2,528,555, which is manufactured by grafting an olefinically unsaturated, polymerizable monomer with hydrolyzable functional groups or a monomer carrying functional carboxyl groups onto a fibrous cellulose material and hydrolyzing the grafted product or treating the latter with alkali in other ways. In this process, the product is first converted to the state of maximum swelling, is then acidified to a pH value at which it is in the state of minimum swelling, is then converted to the form of a salt under conditions which do not effect swelling and is finally dried.

Modified polysaccharide, according to DT-OS No. 2,647,420, manufactured from a polysaccharide, acrylamide, another vinyl monomer and a divinyl monomer, under the conditions of a free-radical reaction.

In the accompanying drawing:

FIG. 1 shows the moisture cycle of various swellable, modified polymers over a period of several days; the weight loss $\Delta G$, in % by weight, was plotted on the ordinate of the coordinate system, and the time t in hours (h) or days (d) was plotted on the abscissa.

FIG. 2 shows the moisture absorption of various natural and synthetic materials as a function of the humidity in their surroundings; the moisture content $\Delta G_F$ of the sample, in % by weight, was plotted on the ordinate of the coordinate system, and the % relative humidity r.F. of the surroundings of the sample was plotted on the abscissa. The numerals in FIG. 2 denote:

1 Tobacco
2 Velour leather and split leather
3 Chemically cross-linked CMC
4 Natural leather
5 Polyurethane film + chemically cross-linked CMC
6 Cotton
7 Gelain
8 Filter paper
Polyurethane film
Caron ®, trademark of Messrs. Hoechst AG (Germany)
11 Clarino ®, trademark of Messrs. Kuraray Co. Ltd., Kurashiki, Okayama (Japan)

The processes for the manufacture of sheet-like structures from polyurethane are known. The sheet-like structure can here be a self-supporting film or it can be produced by coating or impregnating a base of natural or synthetic fiber material, non-woven textile materials or webs of synthetic resin. Preferably, the following bases are used for coating:

Woven or non-woven textile materials composed of one or more components, for example of synthetic fibers, such as polyamides, polyesters, polyacrylonitrile, PVC, polyolefins and polyamino acids, and also of glass fibers, regenerated fiber, such as viscose fibers, acetate fibers and the like, of natural fibers, such as cotton, silk, wool, linen and collagen obtained by abrading natural leather; or sheet-like materials which are composed of one or more components, for example of synthetic resins, such as polyamides, polyesters, polyacrylonitrile, PVC, polyolefins and polyamino acids, or of natural leather, from which the silvery surface has been removed, or of collagen obtained from waste leather, natural rubber and synthetic rubber.

The bases can be coated by the blade process, casting process and spraying process. The polyurethane here can be already present as such or it can be formed from prepolymers on the base during or after the coating of the latter. It is particularly advantageous to manufacture the sheet-like structures according to the invention by the reversal process in which a release carrier is first sprayed with the reactive solution of a mixture of isocyanate prepolymers based on polyester- or on polyether-polyols/diamines and one of the bases described is then placed into the not yet fully reacted layer, and the entire sheet-like structure is laminated. The processes mentioned are described, for example in DT-OS No. 1,570,524, DT-OS No. 2,053,468, DT-AS No. 1,023,449, and DT-AS No. 1,240,656.

In the reactive polyurethane systems, the polyisocyanate component used in the manufacture of the sheet-like structures according to the invention can be either unmodified or, preferably, modified polyisocyanates and/or reaction products which possess at least 2, preferably 2 to 4, hydrogen atoms which are reactive towards isocyanates. In addition to compounds having amino groups, thiol groups or carboxyl groups, these are preferably to be understood as water and high-molecular and/or low-molecular weight polyhydroxy compounds. Examples of suitable high-molecular weight polyhydroxy compounds are polyesters, polyethers, polythioethers, polyacetals, polycarbonates and polyesteramides, having at least 2, preferably 2 to 4 hydroxyl groups and a molecular weight between 500 and 5,000, preferably 800 to 3,000, such as are known for the manufacture of homogeneous and cellular polyurethanes.

Possible polyesters carrying hydroxyl groups are, for example, reaction products of polyhydric, preferably dihydric and, if appropriate, also trihydric, alcohols with polybasic, preferably dibasic, carboxylic acids. In place of the free polycarboxylic acids, the corresponding polycarboxylic acid anhydrides or correspondingly the polycarboxylic acid esters of lower alcohols, or mixtures thereof, also can be used for the manufacture of the polyesters. The polycarboxylic acids can be of aliphatic, cycloaliphatic, aromatic and/or heterocyclic character and, if desired, can be substituted, for example by halogen atoms, and/or can be unsaturated. Examples of these are: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric and trimeric fatty acids, such as oleic acid, if appropriate mixed with monomeric fatty acids, dimethyl terephthalate and bisglycol terephthalate. Examples of polyhydric alcohols which can be used are ethylene glycol, 1,2- and 1,3-propylene glycol, 1,4- and 2,3-butylene glycol, 1,6-hexanediol, 1,8-octanediol, neopentyl glycol, cyclohexanedimethanol (1,4-bis-hydroxymethylcyclohexane), 2-methyl-1,3-propanediol, glycerol, trimethylolpropane, 1,2,6-hexanetriol, 1,2,4-butanetriol, trimethylolethane, pentaerythritol, quinitol, mannitol, sorbitol and methylglycoside, and also diethylene glycol, triethylene glycol, tetraethylene glycol, polyethylene glycols, dipropylene glycol, polypropylene glycols, dibutylene glycol, and polybutylene glycols. The polyesters can have proportions of terminal carboxyl groups. Polyesters obtained from lactones, for example ε-caprolactone, or hydroxycarboxylic acids, for example ω-hydroxycaproic acid, also can be employed.

The polyethers which can be used and which have at least two, as a rule two to eight, but preferably two to three, hydroxyl groups are also those which are known and which are manufactured, for example, by polymerization of epoxides, such as ethylene oxide, propylene oxide, butylene oxide, tetrahydrofuran, styrene oxide or epichlorohydrin with themselves, for example in the presence of $BF_3$, or by an addition reaction of these epoxides, if appropriate as a mixture or successively, with starting components having reactive hydrogen atoms, such as water, alcohols or amines, for example ethylene glycol, 1,3- or 1,2-propylene glycol, trimethylolpropane, 4,4'-dihydroxydiphenylpropane, aniline, ammonia, ethanolamine or ethylenediamine. Sucrose polyethers, such as are described, for example, in DT-AS No. 1,176,358 and DT-AS No. 1,064,938, also can be used. Furthermore, polyethers modified by vinyl polymers, such as are formed, for example, by polymerization of styrene and acrylonitrile in the presence of polyethers (for example U.S. Pat. No. 3,383,351, U.S. Pat. No. 3,304,273, U.S. Pat. No. 3,523,093, U.S. Pat. No. 3,110,695 and German Pat. No. 1,152,536), are suitable, as are polybutadienes containing OH groups.

The polythioethers which may be listed are in particular the condensation products of thiodiglycol with itself and/or with other glycols, dicarboxylic acids, formaldehyde, aminocarboxylic acids or aminoalcohols. Depending on the co-components, these products are mixed polythioethers, polythioether-esters or polythioetheresteramides.

Examples of polyacetals which can be used are the compounds which can be manufactured from glycols, such as diethylene glycol, triethylene glycol, 4,4'-dihydroxyethoxydiphenyl-dimethylmethane or hexanediol, and formaldehyde. Polyacetals which are suitable according to the invention also can be manufactured by polymerizing cyclic acetals.

Possible polycarbonates having hydroxyl groups are those of the types which are in themselves known, which can be manufactured, for example by reacting diols, such as 1,3-propanediol, 1,4-butanediol and/or 1,6-hexanediol, diethylene glycol, triethylene glycol or tetraethylene glycol with diaryl carbonates, for example diphenyl carbonate, or with phosgene.

The polyesteramides and polyamides include, for example, the predominantly linear condensation products obtained from polybasic saturated and unsaturated carboxylic acids or the anhydrides thereof and polyvalent saturated and unsaturated aminoalcohols, diamines, polyamines and mixtures thereof.

It is also possible to use polyhydroxy compounds which already contain urethane groups or urea groups, and optionally modified natural polyols, such as castor oil, carbohydrates or starch. Products of an addition reaction of alkylene oxides with phenol/formaldehyde resins or with urea/formaldehyde resins also can be employed.

Further examples of higher-molecular weight polyhydroxy compounds are described, for example, in High Polymers, Volume XVI, "Polyurethanes, Chemistry and Technology", written by Saunders-Frisch, Interscience Publishers, New York, London, Book I, 1962, pages 32–42 and pages 44–54, and Book II, 1964, pages 5–6 and 198–199, and also in Kunststoff-Handbuch "Plastics Handbook", Volume VII, Vieweg-Höchtlen, Carl-Hanser-Verlag, Munich, 1966, for example on pages 45 to 71.

The lower-molecular weight polyhydroxy compounds (molecular weight 18 to 500) which can be used in addition to water are, for example, the compounds mentioned above as the starting component for the manufacture of polyesters.

Suitable polyisocyanates which are employed in the process according to the invention as such or, preferably, in the form of their reaction products with water and/or the polyhydroxy compounds just mentioned and/or further compounds containing hydrogen atoms which are active in the Zerewitinoff test, can be of aliphatic, cycloaliphatic, araliphatic, aromatic and heterocyclic character. A detailed description of these polyisocyanates has been given, for example, by W. Siefken in Justus Liebigs Annalen der Chemie, 562, pages 75 to 136. Examples which may be mentioned here are ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and any desired mixtures of these isomers, 1-isocyanato-3,3,5-trimethyl-5-isocyanatomethylcyclohexane (DT-AS No. 1,202,785), 2,4- and 2,6-hexahydrotoluylene diisocyanate and any desired mixtures of these isomers, hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-toluylene diisocyanate and any desired mixtures of these isomers, diphenylmethane 2,4'- and/or 4,4'-diisocyanate, naphthylene 1,5-diisocyanate, triphenylmethane 4,4',4"-triisocyanate, polyphenylpolymethylene polyisocyanates, such as are obtained by a condensation reaction of aniline with formaldehyde and subsequent phosgenation and are described, for example, in British Pat. No. 874,430, and British Pat. No. 848,671, perchlorinated aryl polyisocyanates according to DT-AS No. 1,157,601, polyisocyanates containing carbodiimide groups, such as are described in German Pat. No. 1,092,007, the diisocyanates described in U.S. Pat. No. 3,492,330, polyisocyanates containing allophanate groups according to British Pat. No. 994,890, Belgian Pat. No. 761,626 and Netherlands Patent Application No. 71/02,524, polyisocyanates containing isocyanurate groups, such as are described, for example, in German Pat. No. 1,022,789, German Pat. No. 1,222,067, and German Pat. No. 1,027,394 and in DT-OS No. 1,929,034 and DT-OS No. 2,004,048, polyisocyanates containing urethane groups, such as are described, for example, in Belgian Pat. No. 752,261, or in U.S. Pat. No. 3,394,164, polyisocyanates containing acylated urea groups according to German Pat. No. 1,230,778, polyisocyanates containing biuret groups, such as are described, for example in German Pat. No. 1,101,394, in British Pat. No. 889,050 and French Pat. No. 7,017,514, polyisocyanates which are manufactured by telomerization reactions and which are described, for example, in Belgian Pat. No. 723,640, polyisocyanates containing ester groups, such as are mentioned, for example, in British Pat. No. 956,474, and British Pat. No. 1,072,956, in U.S. Pat. No. 3,567,763, and in German Pat. No. 1,231,688, and reaction products of the above-mentioned isocyanates with acetals, according to German Pat. No. 1,072,385.

Within the scope of the invention, reaction products, containing free isocyanate groups, of hexamethylene diisocyanate, toluylene diisocyanate and 1-isocyanato-3-isocyanatomethyl-3,5,5-trimethylcyclohexane with the above described compounds containing active hydrogen atoms are preferred. Preferably, excess volatile, monomeric diisocyanates are removed (for example by distillation in a thin layer evaporator) from these reaction products, before they are used for the manufacture of the sheet-like structure according to the invention.

The compounds which are contained, in addition to the polyisocyanates, in the reactive polyurethane systems to be used in accordance with the invention and which have groups reactive towards isocyanates, are aliphatic and/or aromatic polyamines and, if appropriate, additionally the above-mentioned high-molecular and/or low-molecular weight polyhydroxy compounds.

Examples of polyamines suitable according to the invention are ethylenediamine, propylene-1,2- and -1,3-diamine, 1,4-tetramethylenediamine, 1,6-hexamethylenediamine, diethylenetriamine, N,N'-diisobutyl-1,6-hexamethylenediamine, 1,11-undecamethylenediamine, 1,12-dodecamethylenediamine, cyclobutane-1,3-diamine, cyclohexane-1,3- and -1,4-diamine and mixtures thereof, 1-amino-3,5,5-trimethyl-5-aminomethyl-cyclohexane, 2,4- and 2,6-hexahydrotoluylenediamine and mixtures thereof, perhydro-2,4'- and -4,4'-diaminodiphenylmethane, p-xylylenediamine, bis-(3-aminopropyl)-methylamine, and the like. Hydrazine and substituted hydrazines, for example methylhydrazine, N,N'-dimethylhydrazine and their homologues as well as acid dihydrazides also can be used according to the invention, for example carbodihydrazide, oxalic acid hydrazide, the dihydrazides of malonic acid, succinic acid, glutaric acid, adipic acid, β-methyladipic acid, sebacic acid, hydracrylic acid and terephthalic acid, semicarbazido-alkylene-hydrazides, such as, for example, β-semicarbazido-propionic acid hydrazide (DT-OS No. 1,770,591), semicarbazido-alkylenecarbazine esters, such as, for example, 2-semicarbazidoethyl-carbazine ester (DT-OS No. 1,918,504) or also aminosemicarbazide compounds, such as, for example, β-aminoethyl semicarbazido-carbonate (DT-OS No. 1,902,931).

Examples of aromatic diamines which may be mentioned are bis-anthranilic acid esters according to DT-OS No. 2,040,644 and DT-OS No. 2,160,590, 3,5- and 2,4-diaminobenzoic acid esters according to DT-OS No. 2,025,900, the diamines which contain ester groups and are described in DT-OS No. 1,803,635, DT-OS No. 2,040,650 and DT-OS No. 2,160,589, and also 3,3'-dichloro-4,4'-diaminodiphenylmethane, toluylenediamine, 4,4'-diaminodiphenylmethane and 4,4'-diaminodiphenyl disulfide.

When carrying out the examples, the procedures followed were, in particular, as in the two processes described in the following test (parts are parts by weight):

1. The two components of the compositions 1.1 and 1.2 listed below are thoroughly mixed in a two-component spray gun and applied to a release carrier (matrix). Afterwards it is possible either to peel off a self-supporting film after the reaction has ended, or to place a carrier material (in most cases leather or non-woven) on top after about 1 minute and to peel off the sheet-like structure composed of the carrier and the layer, likewise after the reaction has ended.

| 1.1 Composition | |
|---|---|
| Component A | Component B |
| Baycast ® (from Bayer-AG) | Baycast ® - curing agent HTA |
| — Adduct LPV | 15% concentration |
| + 10% of methyl ethyl ketone | + 15% of dye |
| | + 5% of Baycast ® - fluid |

The components are mixed in a ratio of 180 parts of A to 49 parts of B; the particles of at least one modified, swellable polymer are advantageously added to the component A and are uniformly distributed therein.

| 1.2 Composition | |
|---|---|
| Component A | Component B |
| An 80% concentration by weight isocyanate prepolymer solution, obtained from toluylene diisocyanate (80% by weight of the 2,4-isomer and 20% by weight of the 2,6-isomer) and a polyester of adipic acid, hexanediol and neopentyl glycol (molecular weight = 1,700), in toluene | A curing agent composed of 200 parts of toluylenediamine 800 parts of methyl ethyl ketone 200 parts of brown iron oxide pigment 50 parts of polyether-siloxane as a flow control agent |

The components are mixed in the ratio of 100 parts of A to 26.8 parts of B; the particles of at least one modified, swellable polymer are advantageously added to the component A and uniformly distributed therein.

2. A solution of the polyurethane precursors is prepared and applied to a non-woven by a coagulation process (see, for example, DT-OS No. 1,904,278). To prepare the solution, for example 565 parts by weight of 4,4'-diphenylmethane diisocyanate (Desmodur ® 44 from Bayer AG) and 1,435 parts by weight of a polyester of adipic acid and dibutylene glycol, having an OH number of 66, are reacted for 30 minutes at 75° C. to give a prepolymer having about 6.2% of NCO groups. The prepolymer is dissolved in 5,600 parts by weight of anhydrous dimethylformamide; fillers, such as cellulose or carbon black, can be added to this solution, if desired. About a further 75 parts by weight of water are additionally added to this mixture and the particles of at least one modified, swellable polymer are added to the mixture and uniformly distributed therein. A polyurethane solution prepared in this way and containing the additive has a total solids content of about 5 to 20% by weight, depending on the filler content. The blend is applied in at least one layer to a surface of a textile carrier material (non-woven), the polyurethane is coagulated by the action of a precipitating agent which does not dissolve the polymer and the additive, and the coated base is then dried.

To manufacture the sheet-like structures according to the invention, the particles of at least one modified, swellable polymer are thus added, preferably in a proportion of 10 to 30% by weight, relative to the finished film or the layer, to the base compositions which are to be processed and which are composed, for example, of polyurethane mixtures, to one of the prepolymers or to another of the components in the production processes, before shaping, spreading or allowing the reaction to go to completion, and the particles are uniformly distributed therein; the mixture is then shaped or spread or the reaction is allowed to go to completion. Several thinner layers also can be produced from thicker layers by so-called "splitting" (i.e. splitting a thicker sheet-like structure into two or more thinner sheet-like structures).

The sheet-like structures according to the invention have a high capacity for the absorption of water vapor and the transmission of water vapor, which far exceeds a mere transport effect by the incorporated particles. Furthermore, the sheet-like structures also are able to release the absorbed water vapor again under certain conditions, for example when placed under different climatic conditions.

Because the properties of the sheet-like structures are not merely the result of the significantly detectable effect of the addition of the particles of at least one swellable, modified polymer, but also depend, inter alia, on the thickness of the film or of the coating, the latter is advantageously prepared in a thickness of about 0.05 to 0.5 mm.

The sheet-like structures according to the invention, having the aforesaid properties, are suitable, for example, for use as a self-supporting film or as a coating on a base, in particular as a leather substitute (synthetic leather) for shoe upper material, upholstery covers, bag goods and outer garments (leather garments and all-weather garments).

In FIG. 2 of the accompanying drawing, the behavior of different natural and synthetic materials towards moisture is shown for comparison, in particular in such a way that the moisture content of the particular sample was measured as a function of the relative humidity acting on the sample at 20° C. This shows that chemically crosslinked carboxymethyl cellulose, which represents a selected example of a modified swellable polymer, in combination with the measured moisture cycle according to Example 1, is very suitable for use in the materials according to the invention, in particular when these are used as a leather substitute under physiological conditions (for example as a shoe upper material or as an outer garment material).

The parameters used in the description and the examples for characterizing the sheet-like structures according to the invention and the swellable modified polymers present therein are to be understood as meaning the following:

WRV—Water retention capacity of the swellable modified polymer in % by weight, measured against 1,600 times the acceleration due to gravity, relative to its water-insoluble fraction; WRV is determined after immersing the sample in water.

WUA—Water-insoluble fraction in the swellable modified polymer.

DS—Degree of substitution, i.e., the number of substituted hydroxyl groups on the anhydro-D-glucose units, from 0.0 to 3.0.

SV—Absorbency of the swellable modified polymer for a 1% NaCl solution, in % by weight, relative to its total weight; SV is determined after 1% by weight aqueous NaCl solution has been absorbed by the sample up to saturation.

WA—The water absorption is determined by suspending the sample in liquid water.

$WDD_{PFI}$—Water vapor transmission rate (in accordance with W. Fischer and W. Schmidt, "Das Leder (Leather)", E. Roether-Verlag Darmstadt, 27, 87 et seq. 1976). Inside the apparatus there is a temperature of 32° C., and the sample is under standard climatic conditions—unless otherwise stated—of 20° C./65% relative humidity, these conditions always being kept constant by means of a gentle stream of air from a fan mounted above the apparatus. The free testing surface is 10 cm². Inside the apparatus, the water at 32° C. and the atmosphere above the water, which is saturated with water vapor, are also kept in continuous motion with the aid of a magnetic stirrer. To determine the WDD, the weight loss of the test vessel with the sample is determined. WDD is expressed in mg/cm²·x hours (in most cases x is 1, but it also can be 8 or 24).

$WDD_{DIN}$—Water vapor transmission rate, gravimetric process for determining the WDD (according to DIN 53,122 of November 1974; this factually agrees with ISO/R 1195-170 "Plastics, Determination of the water vapor transmission rate of plastic film and thin sheets, Dish Method"). A dish with an absorbent is sealed by the sample with the aid of wax and stored in moist climatic conditions. The amount of water vapor which is transmitted through the sample, is calculated from the weight increase of the dish as soon as this increase becomes linear with time. The water vapor transmission rate WDD according to this standard is that amount of water vapor in g which is transmitted in 24 hours (1 day) under defined conditions (temperature, gradient of the atmospheric humidity) through 1 m² of surface area of the sample.

WDA—Water vapor absorption (see also $WDD_{PFI}$). The water vapor absorption is carried out simultaneously with the measurement of $WDD_{PFI}$, by determining the increase in weight of the sample; unless otherwise stated, the sample is permeable with respect to the outside climatic conditions, i.e. it is not covered.

Flexural strength—Measurement of the permanent flexural strength of light-weight leathers and their top layers (I.U.P./20 of the Internationale Union der Leder-Chemiker-Verbände (International Union of Associations of Leather Chemists), see "Das Leder (Leather)", E. Roether-Verlag, Darmstadt, 15, 87 (1964) and 26, 163 (1969)). The leather sample is folded, and, in this state, its two ends are clamped into the test instrument. One clamp is stationary and the other moves to and fro, so that the fold moves up and down along the leather sample. The leather sample is tested at intervals in order to establish whether damage has occurred thereon. The test can be carried out with dry samples, conditioned samples or samples which have been moistened in a certain way. The dry experiment is intended to test the leather and its finishing. The wet experiment solely serves to assess the finishing.

Tensile strength—Measurement of the tensile strength in a tensile test (according to DIN 53,328 of December 1970, which factually agrees with the I.U.P./6 process of the Internationale Union der Leder-Chemiker-Verbände (International Union of Associations of Leather Chemists), see "Das Leder (Leather)", E. Roether-Verlag Darmstadt, 10, 14 (1959)). The tensile strength $\sigma_B$ is the quotient of the measured maximum force in kp and the initial cross-section of the sample in cm².

The invention will be further illustrated by reference to the following specific examples:

EXAMPLE 1

The moisture cycles of three different swellable, modified polymers are investigated over a period of several days. A certain amount of the polymer is first stored for at least 24 hours under standard climatic conditions (temperature of 23° C., 50% relative atmospheric humidity) and weighed. In a constantly recurring rhythm, the procedure is then as follows: the polymer sample is kept for 8.0 hours under moist climatic conditions (temperature 30° C., 100% relative atmospheric humidity), is weighed, is then again kept for 16.0 hours under the standard climatic conditions (23° C., 50% relative atmospheric humidity) and is weighed again. The measured values obtained are plotted in a coordinate system (FIG. 1); the increase in weight, in % by weight, is recorded on the ordinate and the time in hours is recorded on the abscissa. The line designated as —in FIG. 1 represents the moisture cycle of a mixture, cross-linked with bisacrylamido-acetic acid, of a quaternary cellulose-ammonium salt and cellulose, having WRV=1,160, WUA=98 and SV=950, the line designated as ---represents the moisture cycle of a mixture of carboxymethyl starch and carboxymethyl cellulose hydrate, each cross-linked with bisacrylamidoacetic acid, having WRV=11,250, WUA=85.1 and SV=1,920, and the line designated as . . . represents the moisture cycle of a carboxymethyl cellulose, cross-linked with bisacrylamido-acetic acid, having WRV=3,270 and WUA=97. The comparison of the individual moisture cycles shows that the moisture absorbed by the particular swellable, modified polymer can be repeatedly released again under certain conditions. This property is of great importance for, for example, the incorporation of these polymers into films which can be used in shoe upper material or for sheet-like structures of other types; this is because, for example, a shoe is worn for a certain time during which the shoe upper material is provided from the inside with a certain amount of moisture by the foot; during rest periods (for example during the night) the shoe upper material should be able to release this moisture again to its surroundings.

EXAMPLES 2 TO 9 AND COMPARATIVE EXAMPLES V1 to V3

The tensile strength ($\sigma_B$), the flexural strength, the water vapor absorption (WDA) and the water vapor transmission rate (WDD$_{PFI}$) of four different non-wovens (Examples 2 to 5), suitable as a carrier layer (base) for synthetic shoe upper material, are determined and compared with the corresponding values of those non-wovens to which a polyurethane coating with the addition of a swellable, modified polymer is applied (see Table I). The directions a and b, indicated in the determination $\sigma_B$, differ in that their directional axes enclose an angle of 90°. The Comparative Examples V1 to V3 give measured values for aniline leather (V1), unmodified polyurethane shoe upper material (V2) and coated leather (V3).

EXAMPLES 10 TO 19

The water vapor absorption (WDA) and the water vapor transmission rate (WDD$_{PFI}$) of polyurethane films (Examples 10 to 17) of various thickness and with the addition of a swellable, modified polymer are determined (Table II). In Examples 18 and 19 (Table II), a polyurethane coating, according to the invention, of about 0.4 mm thickness on split leather as the carrier is examined, the split leather layer being outside the determination vessel in Example 18 and inside the vessel in Example 19. The flexural strength of the last-mentioned samples at a temperature of +20° C. is still good after 200,000 folds (i.e. cracks do not yet appear), and the flexural strength at a temperature of −10° C. is still good after 50,000 folds.

EXAMPLES 20 AND 21 AND COMPARATIVE EXAMPLES V4 AND V5

The water vapor absorption (WDA) and the water vapor transmission rate (WDD$_{PFI}$) of polyurethane films of various thicknesses, with and without an addition of modified, swellable polymer, are investigated (Table III).

Example 20: polyurethane film (film split from a thicker film) without an addition of dye, with particles of modified, swellable polymer, Example 21: polyurethane film (manufactured directly in this thickness) without an addition of dye, with particles of modified, swellable polymer, V4: polyurethane film (film split from a thicker film) without an addition of dye and polymer particles V5: polyurethane film (manufactured directly in this thickness) without an addition of dye and polymer particles.

EXAMPLES 22 TO 24 AND COMPARATIVE EXAMPLE V6

The moisture content (in % by weight) of polyurethane films or of a polyurethane layer on a carrier, with and without an addition of modified, swellable polymer, is determined at 20° C. at different relative humidities. Before the measurement, each of the samples is subjected for 24 hours to climatic conditions of 65% relative humidity/20° C., and they are then transferred into the appropriate humidity conditions and weighed after 3 time intervals (Table IV).

Example 22: black polyurethane film with an addition of particles of modified, swellable polymer Example 23: polyurethane film without an addition of dye and with an addition of particles of modified, swellable polymer V6: polyurethane film without an addition of dye and polymer particles Example 24: black polyurethane layer with an addition of particles of modified, swellable polymer on a carrier composed of an absorbent non-woven.

TABLE I

| Example | Additive | Thickness of the non-woven without or with a coating (mm) | Layer thickness (mm) |
|---|---|---|---|
| 2 | without | 0.98 | — |
| 3 | " | 0.98 | — |
| 4 | " | 1.28 | — |
| 5 | " | 1.21 | — |
| 6 | 10% by weight of CMC cross-linked with bisacrylamido-acetic acid, having DS = 1.02, WRV = 542, WUA = 83.8, and SV = 1,130, at a particle size of ≦ 125μ | 1.42 | 0.44 |
| 7 | " | 1.50 | 0.52 |
| 8 | " | 1.78 | 0.50 |
| 9 | " | 1.50 | 0.29 |
| V 1 | — | — | — |
| V 2 | — | — | — |
| V 3 | — | — | — |

| | $\sigma_B$ | | Flexural strength as the number of folds | | WDA in (mg/cm². 8 hours) on | | | WDD$_{PFI}$ | | | | | |
|---|---|---|---|---|---|---|---|---|---|---|---|---|---|
| | | | | | | | | in (mg/cm² 8 hours) on the | | | in (mg/cm² . 1 hour) on the | | |
| Example | in the direction a | in the direction b | at +20° | at −10°C. | 1st day | 2nd day | 4th day | 1st day | 2nd day | 3rd day | 1st day | 2nd day | 3rd day |

TABLE I-continued

| | | | | | | | | | | | | | | |
|---|---|---|---|---|---|---|---|---|---|---|---|---|---|---|
| 2 | 11.4 | 6.8 | 150,000 | 30,000 | 0.12 | 0.15 | 0.12 | 120.6 | 121.4 | 118.6 | 15.1 | 15.2 | 14.8 |
| 3 | 10.0 | 6.1 | folds | folds | 0.34 | 0.31 | 0.16 | 121.6 | 118.7 | 119.9 | 15.2 | 14.8 | 15.0 |
| 4 | 11.7 | 9.3 | good | good | 0.40 | 0.40 | 0.19 | 109.7 | 110.1 | 110.6 | 13.7 | 13.8 | 13.8 |
| 5 | 12.0 | 7.2 | | | 0.49 | 0.39 | 0.18 | 113.7 | 110.8 | 113.5 | 14.2 | 13.8 | 14.2 |
| 6 | 13.8 | 10.5 | very fine to fine cracks in the top layer after 50,000 folds, fractures in the top layer after more than 100,000 folds | cracks after 25,000 folds | 38.87 | 37.37 | 37.22 | 5.41 | 3.94 | 3.56 | 0.68 | 0.49 | 0.45 |
| 7 | 12.3 | 9.2 | | | 39.18 | 39.57 | 39.45 | 2.49 | 2.92 | 3.10 | 0.31 | 0.37 | 0.39 |
| 8 | 16.0 | 11.8 | | | 39.33 | 39.33 | 39.04 | 3.46 | 3.00 | 2.71 | 0.43 | 0.38 | 0.34 |
| 9 | 12.9 | 10.8 | | | 41.39 | 41.51 | 41.01 | 3.74 | 3.64 | 3.80 | 0.47 | 0.46 | 0.48 |
| V 1 | — | — | — | — | 25.7 | — | — | 27.5 | — | — | 3.44 | — | — |
| V 2 | — | — | — | — | 18.8 | — | — | 10.4 | — | — | 1.30 | — | — |
| V 3 | — | — | — | — | — | — | — | 8-12 | — | — | 1-1.5 | — | — |

TABLE II

| Example | Additive | Layer Thickness (mm) | WDA (mg/cm · 8 hours) | $WDD_{PFI}$ (mg/cm² · 8 hours) | (mg/cm² · 1 hour) |
|---|---|---|---|---|---|
| 10 | 15% by weight of CMC cross-linked with bisacrylamido-acetic acid, having DS = 1.02, WRV = 542, WUA = 83.8 and SV = 1,130, at a particle size of ≦125μ | 0.27 | 6.11 | 14.44 | 1.81 |
| 11 | " | 0.28 | 5.27 | 16.42 | 2.05 |
| 12 | " | 0.29 | 4.83 | 13.56 | 1.70 |
| 13 | " | 0.32 | 5.41 | 11.79 | 1.47 |
| 14 | " | 0.36 | 6.02 | 9.20 | 1.20 |
| 15 | " | 0.38 | 6.47 | 9.00 | 1.13 |
| 16 | " | 0.65 | 9.91 | 4.32 | 0.54 |
| 17 | " | 0.68 | 9.32 | 3.67 | 0.46 |
| 18 | " | — | 7.08 | 8.19 | 1.02 |
| 19 | " | — | 41.60 | 2.78 | 0.35 |

TABLE III

| Example | Additive | Layer Thickness (mm) | WDA (mg/cm² · 8 hours) | % by weight | $WDD_{PFI}$ (mg/cm² · 8 hours) | (mg/cm² · 1 hour) |
|---|---|---|---|---|---|---|
| 20 | 15% by weight of CMC crosslinked with bisacrylamido-acetic acid, having DS = 1.02, WRV = 542, WUA = 83.8, and SV = 1,130 at a particle size of ≦125μ | 0.37 | 8.88 | 17.02 | 13.75 | 1.72 |
| 21 | 15% by weight of CMC crosslinked with bisacrylamido-acetic acid, having DS = 1.02, WRV = 542, WUA = 83.8, and SV = 1,130 at a particle size of ≦125μ | 0.71 | 10.67 | 12.25 | 6.10 | 0.76 |
| V 4 | without | 0.38 | 1.13 | 2.16 | 3.89 | 0.49 |
| V 5 | without | 0.80 | 1.33 | 1.32 | 3.12 | 0.39 |

TABLE IV

| | | Moisture content of the samples (% by weight) at | | | | | | | | | |
|---|---|---|---|---|---|---|---|---|---|---|---|
| | | 20% relative humidity | | | 35% relative humidity | | | 65% relative humidity | 95% relative humidity | | |
| Example | Additive | 4 hours | 8 hours | 24 hours | 4 hours | 8 hours | 24 hours | 24 hours | 4 hours | 8 hours | 24 hours |
| 22 | see Example 20 | 2.77 | 2.57 | 2.48 | 2.91 | 2.71 | 2.64 | 4.00 | 9.02 | 10.91 | 16.11 |
| 23 | see Example 20 | 2.63 | 2.47 | 2.38 | 2.93 | 2.76 | 2.67 | 3.78 | 8.80 | 10.74 | 16.28 |
| V 6 | without | 0.63 | 0.60 | 0.57 | 0.70 | 0.67 | 0.63 | 1.07 | 1.54 | 1.54 | 1.60 |
| 24 | see Example 20 | 2.75 | 2.58 | 2.48 | 2.87 | 2.70 | 2.62 | 3.60 | 6.31 | 7.32 | 10.44 |

It will be obvious to those skilled in the art that many modifications may be made within the scope of the present invention without departing from the spirit thereof, and the invention includes all such modifications.

What is claimed is:

1. In a sheet-like structure of polyurethane, which is capable of absorbing water vapor and transmitting water vapor, with a uniformly incorporated additive, the improvement comprising that said additive is composed of solid particles of at least one modified starch ether or cellulose ether, which has been modified by cross-linking, effected by means of heat energy, radiation or an additional chemical compound, which is insoluble in water to the extent of at least 50% by weight, and which is swellable in aqueous liquids.

2. A sheet-like structure as claimed in claim 1, wherein said additional chemical compound is selected from the group consisting of phosphorus oxychloride, dichloroacetic acid and a compound which carries the following group which is reactive towards hydroxy groups:

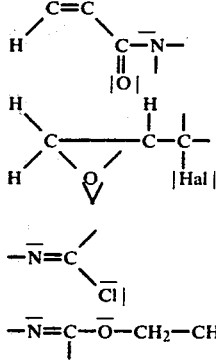   the acrylamido group, $R_1$ being H or $CH_3$, or an α-halogenoepoxy group, Hal being Cl or Br, or the chloro-azomethine group, or

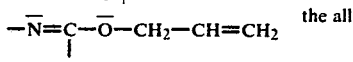   the alloxy-azomethine group.

3. A sheet-like structure as claimed in claim 1 which comprises about 10 to 30% by weight of additive.

* * * * *